March 20, 1956  J. L. M. MORRISON  2,738,997
SEALING GLANDS FOR PRESSURE VESSELS
Filed March 5, 1951
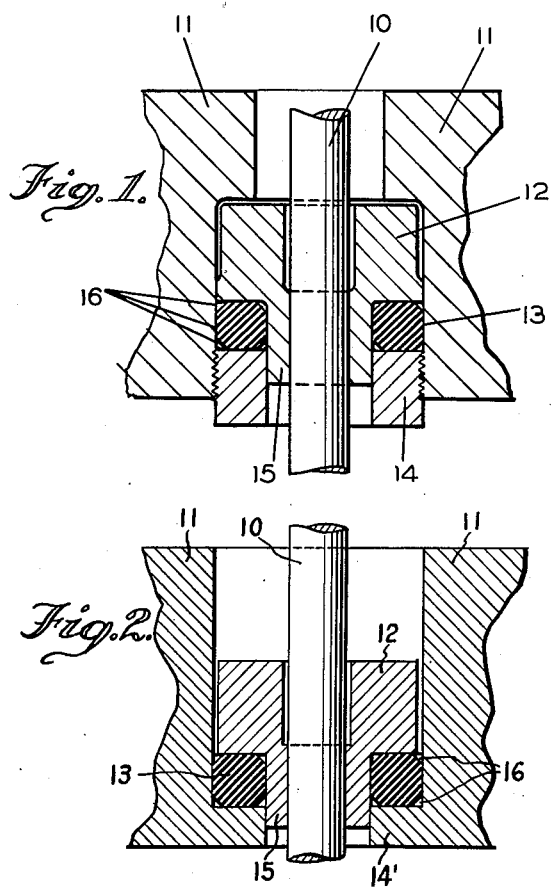
INVENTOR
JOHN LAMB MURRAY MORRISON
ATTORNEYS United States Patent Office 2,738,997
Patented Mar. 20, 1956

2,738,997

SEALING GLANDS FOR PRESSURE VESSELS

John Lamb Murray Morrison, Bristol, England, assignor to Imperial Chemical Industries Limited, a corporation of Great Britain Application March 5, 1951, Serial No. 213,851

7 Claims. (Cl. 286—26)

The present invention comprises improvements in or relating to sealing glands for high pressure vessels and it is an object of the invention to provide a form of sealing gland for pressure vessels which is more satisfactory in use than sealing glands hitherto employed. The form of sealing gland provided by the invention is particularly suitable for use in pressure vessels which are subject to high pressures of the order of say 100 atmospheres and upwards and which require a reciprocating or rotating member to be introduced into the vessel, for example as in the case of pumps or compressors or as required for the purpose of operating an agitator or stirrer in a pressure vessel, but the present sealing gland is also capable of use with certain accompanying advantages for pressure vessels subject to pressures lower than those referred to above.

It is common practice in, for example, pumps which operate at pressures of say 3 to 5 tons per square inch, to employ a cylindrical sealing sleeve surrounding a reciprocating rod with both sleeve and rod of metal (usually steel) and with an initial small clearance of some hundred-thousandths of an inch between the sleeve and the rod. Such a sleeve has also been arranged to be always subject to the internal pressure to be sealed over at least the greater part of the outer surface of the sleeve. For very high pressures allowance is required to be made for lateral expansion of the rod under high axial loads when providing an initial clearance between the rod and sleeve and entrance of high pressure fluid to the clearance space will expand the sleeve and compress the rod and thus tend to increase leakage at the gland. This form of sealing sleeve is thus considered unsatisfactory for use at high pressures and particularly so when considerable variation takes place in the pressure to be sealed.

It is also commonly arranged, for example in intensifiers, for a resilient sealing material such as natural or synthetic rubber to be employed. By enclosing a sealing ring of such material between retaining rings of which the inner ring is of greater diameter than that of the sealing material and is subject to the internal pressure over the said greater diameter, the pressure in the sealing material is at all times of a value which exceeds the internal pressure to be sealed. By this means leakage can be reduced practically to zero, but the high pressure exerted between the sealing material and the piston inevitably produces excessive friction. The life of the sealing material is in consequence short, and considerable heat is also generated as a result of the frictional contact.

According to the present invention a sealing gland for a high pressure vessel comprises a sealing sleeve for an operating rod passing into the vessel, a sealing ring of relatively resilient material housed to surround and engage the sleeve, and retaining members for the endwise support and enclosure of the sealing sleeve and sealing ring respectively whereof the retaining member for the sealing ring disposed inwardly of the vessel and subject to the pressure therein affords an end surface subject to such pressure of larger area than its area of contact with the sealing ring.

Conveniently in accordance with the present invention a sealing gland for a high pressure vessel comprises a shouldered sleeve for an operating rod passing into the vessel with the thicker end of the sleeve exposed to the high pressure, a sealing ring of relatively resilient material fitting in a cylindrical housing and engaging the shoulder, and a retaining member for the low pressure side of the sealing ring.

The sealing ring of such a sealing gland is to be understood as of relatively resilient material as compared with that of the sealing sleeve which is itself relatively rigid as compared with the material of the sealing ring. The actual materials employed for these parts in any one sealing gland will depend on the pressures to be encountered and a material (e. g. a synthetic plastic material such as a polyvinyl resin which may be polyvinyl chloride) capable of use for a relatively rigid sleeve in conjunction with a soft and resilient sealing material in a gland for use at low pressures, may in fact be a suitably resilient sealing material for use with a sleeve of more rigid material in a gland for use at very high pressures. Suitable resilient material for the sealing ring which may be employed over a wide range of pressures include for example red fibre, or compressed asbestos for use at high temperatures, or natural or synthetic rubber and polythene for use at ordinary temperatures.

Preferably the sealing sleeve is of metal with wall thickness less than that of the retaining member or members, and preferably is rigidly supported by (e. g. formed integrally with) one of the gland retaining members, as in the case of the shouldered sleeve referred to above. In one form of the invention the low pressure retaining member may be formed integrally with the wall of the pressure vessel in which case assembly is effected from the interior of the vessel.

In the use of a sealing gland constructed in accordance with the invention a seal, which may be metal-to-metal, is provided in which the clearance is controlled to a small but finite value for all fluid pressures within the pressure vessel within the operating range.

One form of sealing gland constructed in accordance with the invention is described hereinafter by way of example with reference to the accompanying drawings in which Figure 1 is a vertical sectional view of one embodiment of a sealing gland constructed in accordance with the principles of the present invention and Figure 2 is a vertical sectional view of a modified sealing gland according to the present invention.

In Figure 1 a piston, piston rod, or other operating member for a stirrer or the like to be passed into the pressure vessel is represented at 10, a part of the walls of the pressure vessel being indicated at 11. A retaining member 12 for the sealing ring 13 is exposed on the upper surface of the retaining member 12 to the fluid pressure within the pressure vessel. The axial thrust on the retaining member 12 is opposed by the outer retaining or supporting member 14 for the sealing ring 13, which member 14 is secured by screw-threaded engagement with the opening in the walls of the pressure vessel. The sealing ring 13 is of rubber or like material (such as synthetic rubber) and is initially a reasonably good fit in the space provided within the opening in the walls 11 of the pressure vessel and surrounding the axial sleeve extension 15 formed on the retaining member 12 so that the parts 12 and 15 together form a shouldered sleeve for the rod 10. It will be seen that the sealing ring 13 is at all times exposed to a pressure in excess of the fluid pressure within the vessel 11 since the area of contact between the shoulder of the retaining member 12 and the sealing ring 13 in a cross sectional direction is less than the end surface area of the member 12 subject to the fluid pressure within the vessel. The pressure fluid will accordingly not tend to leak past the sealing ring 13, and to avoid extrusion of the rubber ring 13 upwards into the pressure vessel or downwards between the retaining members for the sealing ring the clearance between these members and between the member 12 and the walls 11 adjacent the wing 13 must initially be very small. In this connection chamfered rings 16, preferably of metal but in any case of material more rigid than that of the sealing ring 13, may be provided to engage the ring 13 at those positions where extrusion of the sealing ring may occur, such extrusion thereby being prevented.

The form of the shouldered retaining member 12 is also such as to be exposed to the fluid pressure within the vessel on all sides, the clearance provided for this purpose being exaggerated in the drawing. The operating rod 10 is similarly exposed to these pressures on all sides. It follows that there will be no sensible change in the clearance between the rod and the thicker part (i. e. other than the sleeve 15) of the shouldered retaining member 12, the lower end of which is conveniently machined away to provide the relatively thin sleeve 15 surrounding the rod 10. The clearance between the rod 10 and the cylinder 15 is arranged initially to be extremely small and in the assembled sealing gland the cylinder 15 is exposed on its inner surface to a pressure which will vary from the fluid pressure within the vessel at the upper end of the cylinder to substantially atmospheric pressure at the lower end. The tendency of such pressure to cause the cylinder 15 to expand and provide a leakage channel is successfully overcome since the cylinder is exposed over part of its length on its external surface to a pressure from the sealing ring 13 greater than the fluid pressure within the pressure vessel and effectively sealing the parts 10 and 15 against leakage. The length over which this excess pressure is applied can be modified by adjustment of the thickness of the sealing ring 13.

It is to be noted that stability of the sealing sleeve 15 is secured by providing this sleeve in the shouldered form described so as to be integral with the retaining member 12 for the sealing ring 13. The end of the sleeve adjacent to and integral with the retaining member is so constrained that its change of diameter is extremely small.

In place of the screw-threaded retaining member 14, the walls 11 of the pressure vessel may alternatively be integrally formed, as indicated at 14' in Figure 2 to retain the gland which is then assembled from the interior of the vessel. In all cases it is desired that the enlarged end area of the part 12 in relation to its lesser area of contact at the shoulder with the sealing ring 13 ensures an effective seal by the ring 13 against the walls 11 and also deforms the sleeve 15 to prevent leakage between the sleeve and rod 10 without causing the latter to seize in the sleeve. These conditions are achieved when the outside diameter of the sleeve is very approximately of the order of the mean of outside diameters of the operating rod 10 and of the shoulder 12. Large variations from such relative sizes can however be successfully made.

What I claim is:

1. A sealing gland for a high pressure vessel having an operating rod extending outwardly from within said vessel, said gland comprising a sealing sleeve for engagingly surrounding said operating rod, a first retaining member having an annular shoulder positioned radially outwardly of the inner end of said sleeve and an end surface opening to the pressure within the vessel when said sleeve is disposed about said rod, a sealing ring of relatively resilient material surrounding and engaging said sleeve and abutting said shoulder, a second retaining member forming with said first retaining member an endwise enclosure of said ring, the end surface of said first retaining member subjected to the pressure within said vessel being of larger area than the area of abutment between said shoulder and said sealing ring whereby the pressure exerted on said sleeve by said sealing ring will exceed the pressure within the vessel.

2. A sealing gland as claimed in claim 1 wherein said first retaining member comprises a thickened integral part of said sleeve.

3. A sealing gland as claimed in claim 1 wherein the outside diameter of said sleeve is substantially equal to the mean of the outside diameters of said operating rod and shoulder.

4. A sealing gland as claimed in claim 1 wherein said sleeve is of metal with a wall thickness less than that of said first retaining member.

5. A sealing gland as claimed in claim 1 wherein said second retaining member is secured by screw threaded engagement with the wall of the pressure vessel.

6. A sealing gland as claimed in claim 1 wherein said second retaining member is formed integrally with the wall of said pressure vessel and the gland is assembled from the interior of the vessel.

7. A sealing gland for a high pressure vessel having an operating rod extending outwardly from within said vessel, a sealing sleeve of relative rigid material surrounding said rod, said sleeve receiving said rod therein in close engagement and having its inner end opening to pressure within the vessel, a first retaining member movably carried by said vessel, said first retaining member being rigidly secured to said sleeve and having an annular shoulder positioned radially outwardly of the inner end of said sleeve and an end surface opening to the pressure within the vessel, a sealing ring of relatively resilient material surrounding and engaging said sleeve and abutting said shoulder, a second retaining member rigidly carried by said vessel and forming with said first retaining member an endwise enclosure of said ring, the end surface of said first retaining member subject to the pressure within said vessel being of larger area than the area of abutment between said shoulder and said sealing ring whereby the pressure exerted on said sleeve by said sealing ring will exceed the pressure within the vessel.

References Cited in the file of this patent

UNITED STATES PATENTS

| 492,217 | Loss | Feb. 21, 1893 |
| 1,725,836 | Solberg | Aug. 27, 1929 |
| 2,068,720 | Vincent | Jan. 26, 1937 |
| 2,117,472 | Flick et al. | May 17, 1938 |
| 2,308,149 | Bingham | Jan. 12, 1943 |
| 2,309,154 | Adair | Jan. 26, 1943 |
| 2,518,097 | Thornhill | Aug. 8, 1950 |
| 2,567,527 | Parks | Sept. 11, 1951 |

FOREIGN PATENTS

| 224,101 | Great Britain | Nov. 6, 1924 |
| 648,628 | Great Britain | Jan. 10, 1951 |
| 925,794 | France | Mar. 31, 1947 |

OTHER REFERENCES

"Vinylidene Chloride Polymers" (Goggin and Lowry), published in Industrial and Engineering Chemistry, vol. 34, No. 3 of March 1942, pages 327–332 relied on. (Copy in Scientific Library and Div. 52.)